United States Patent
Zosimodis

[11] Patent Number: 5,845,844
[45] Date of Patent: Dec. 8, 1998

[54] WIRELESS TEMPERATURE MONITORING SYSTEM

[76] Inventor: Peter Zosimodis, 2 Redwater Drive, Etobicoke, ON., Canada, M9W 1Z6

[21] Appl. No.: 628,320

[22] Filed: Apr. 4, 1996

[30] Foreign Application Priority Data

Nov. 13, 1995 [CA] Canada .................................. 2162802

[51] Int. Cl.⁶ .................................................. G05D 23/13
[52] U.S. Cl. .............................. 236/12.12; 236/51; 4/676
[58] Field of Search ...................... 236/93 B, 51, 236/12.12; 4/675–678

[56] References Cited

U.S. PATENT DOCUMENTS

| | | | |
|---|---|---|---|
| 4,700,884 | 10/1987 | Barrett et al. | 236/12.12 |
| 4,735,357 | 4/1988 | Gregory et al. | 236/93 R |
| 4,762,429 | 8/1988 | Fujikawa | 374/163 |
| 4,941,608 | 7/1990 | Shimizu et al. | 236/12.12 |
| 5,050,062 | 9/1991 | Hass | 236/12.12 |
| 5,199,790 | 4/1993 | Pawelzik et al. | 374/147 |
| 5,226,629 | 7/1993 | Millman et al. | 251/129.04 |
| 5,358,177 | 10/1994 | Cashmore | 236/12.12 |
| 5,400,961 | 3/1995 | Tsutsui et al. | 236/12.12 |
| 5,449,112 | 9/1995 | Heitman et al. | 236/51 |
| 5,476,221 | 12/1995 | Seymour | 236/51 |
| 5,577,660 | 11/1996 | Hansen | 236/12.12 |
| 5,595,342 | 1/1997 | McNair et al. | 236/51 |

FOREIGN PATENT DOCUMENTS

| | | |
|---|---|---|
| 2090131 | 8/1993 | Canada . |
| 2128725 | 6/1994 | Canada . |
| 0 175 552 | 3/1986 | European Pat. Off. . |
| 0 446 953 | 9/1991 | European Pat. Off. . |
| 2 550 648 | 2/1985 | France . |
| WO 87/05352 | 9/1987 | WIPO . |

Primary Examiner—William E. Tapolcai

[57] ABSTRACT

The present invention relates to a wireless temperature monitoring system useful in reducing the risk of scalding to a user. The system includes a temperature sensor/transmitter on the end of a faucet which communicates via a wireless link to a controller. The wireless link is utilized to facilitate installation on a faucet. The invention may also provide a digital display with audio and/or visual alarms to indicate if a pre-set maximum temperature has been exceeded and a shut-off valve to interrupt flow of water to the faucet.

23 Claims, 10 Drawing Sheets

WIRELESS TEMPERATURE MONITORING SYSTEM

FIELD OF THE INVENTION

The present invention relates to a wireless temperature monitoring system useful in reducing the risk of scalding to a user. The system includes a temperature sensor/transmitter on the end of a faucet which communicates via a wireless link to a controller. The wireless link is utilized to facilitate installation on a faucet. The invention may also provide a digital display with audio and/or visual alarms to indicate if a pre-set maximum temperature has been exceeded and a shut-off valve to interrupt flow of water to the faucet.

BACKGROUND OF THE INVENTION

The risk of scalding through the use of hot water faucets by certain groups of people, particularly disabled, elderly or young children, is present in many homes or institutions. Often, these people mistake the hot and cold water taps on a faucet or have difficulty operating a faucet which leads to exposure to dangerously hot water from the faucet. Typically, water temperatures in excess of 42° C. can cause injury to unprotected skin. While, in various hot water heaters it is possible to set the thermostat to a lower temperature, many hot water tanks have their thermostats set in excess of 60° C. in order to ensure adequate hot water supply to the system for tasks such as laundry or running a dishwasher where a higher water temperature is desired.

Accordingly, there has been a need for products which effectively control the flow of hot water from a faucet to ensure that potentially scalding temperatures are not exceeded through particular faucets in a hot water system.

Past temperature monitoring and shut-off systems exist for controlling the flow of water or a fluid through conduits. Systems also exist with respect to faucets which regulate and control the flow of water to a faucet. These systems often include mechanisms for electronically monitoring the water temperature and adjusting the flow of hot and cold water to control a selected temperature. One disadvantage of these systems is that they are often highly complex requiring complete replacement of an entire faucet to implement their installation. The complexity often leads to an increased cost to the consumer.

Furthermore, these past systems may detract from the aesthetic look of a particular faucet by requiring unsightly attachments to the faucet or, alternatively, requiring the complete replacement of a faucet with a design which does not complement the overall style or look to a bathroom or kitchen. For example, in those systems which do not require replacement of the existing faucet, the installation detracts from the aesthetic appearance of the faucet either through visible wires or valves and/or complex control panels.

Accordingly, there has been a need for an anti-scald device which may be installed on existing faucets without detracting from the aesthetic look of the faucet, specifically without the use of unsightly wires or mechanisms. Furthermore, there has been a need for an anti-scald device which can be readily installed in a few minutes by either a plumber or lay person with minimal plumbing experience.

Specifically, there has been a need for a device which monitors the temperature of water flowing from a faucet and communicates the temperature information to a controller for processing through a wireless communication link. Information received from the controller may be used for providing a digital display of temperature or for controlling a shut-off valve in the event that the water temperature exceeds that of pre-set value.

A review of the prior art indicates that systems exist which provide water temperature monitoring, control and shut-off in the event of excess temperatures. These include devices disclosed in U.S. Pat. No. 4,256,258, U.S. Pat. No. 5,184,642, U.S. Pat. No. 4,756,030, U.S. Pat. No. 4,886,207 and U.S. Pat. No. 5,226,629 However, none of these patents disclose a device which addresses and solves the above problems, specifically providing a device which can be readily retrofitted to existing faucets without significantly detracting from the aesthetic look of the faucet.

SUMMARY OF THE INVENTION

In view of the above needs, the invention seeks to provide an anti-scald device which may be readily configured to existing faucets and which does not significantly detract from the aesthetic look of the faucet.

Accordingly, the invention provides a temperature sensing device and transmitter, preferably for attachment to the end of a faucet with a screw ring having a standard thread. Temperature information from the faucet is transmitted to the controller where it may be used to actuate a hot-water shut-off valve, provide a digital display of actual temperature or both. In the case of a hot-water shut-off valve, it is preferable that the shut-off valve is battery operated. In one embodiment, the controller and shut-off valve are distinct units which communicate by a wireless link.

In another embodiment, the system may be provided with a reset switch to allow the user to reactivate hot water supply if the system has been shut-off.

The system may also be provided with the ability to over-ride the anti-scald system to allow higher water temperatures to be attained. The over-ride feature may require special keystrokes to enable specific tasks such as washing clothes or dishes to be undertaken.

Thus, in accordance with the invention, a faucet control system to monitor the temperature of a fluid flowing from a faucet is provided, the faucet control system comprising:

a temperature sensor and transmitter for attachment to the faucet, the temperature sensor and transmitter for obtaining temperature data of a fluid flowing from the faucet and for transmitting the temperature data;

controller for receiving and processing the temperature data wherein the controller includes means for interrupting fluid flow from the faucet if the temperature of the fluid flowing from the faucet exceeds a pre-set value.

As well, the invention provides a faucet control system comprising:

a temperature sensor and transmitter for attachment to a faucet, the temperature sensor and transmitter for obtaining temperature data of a fluid flowing from the faucet and for transmitting the temperature data;

controller for receiving and processing the temperature data wherein the controller includes means for displaying the temperature of the fluid flowing from the faucet.

In a preferred embodiment, the temperature sensor and transmitter continuously transmits the temperature data and includes means for transmitting a by-pass signal. Preferably, a pulse-width modulated signal is utilized.

The valve unit preferably includes means for toggling between a safety on and safety off mode wherein the valve unit toggles to the safety off mode upon receipt of a by-pass signal. First and second timing circuits are preferably utilized during the safety on and safety off modes of operation. Still, further, it is preferable that the valve unit includes a means for checking battery status and an alarm means for notifying a user in the event of low battery status.

In this embodiment of the invention, the unit may also include a base unit for receiving, displaying and interpreting temperature data from the temperature sensor and transmitter which itself may include an alarm means for notifying a user if the temperature of the fluid flowing from the faucet exceeds a pre-set maximum temperature.

BRIEF DESCRIPTION OF THE DRAWINGS

These and other features of the invention will be more apparent from the following description in which reference is made to the appended drawings wherein.

DETAILED DESCRIPTION OF THE INVENTION

Figure 1A:
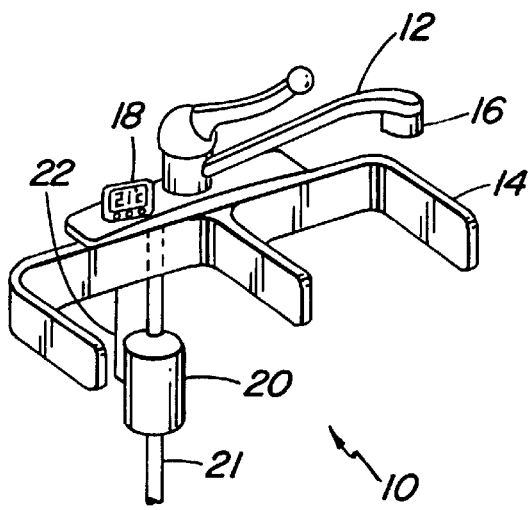
FIG. 1a is a perspective view of one embodiment of the invention showing a wired link between the controller and shut-off valve.
Figure 1B:
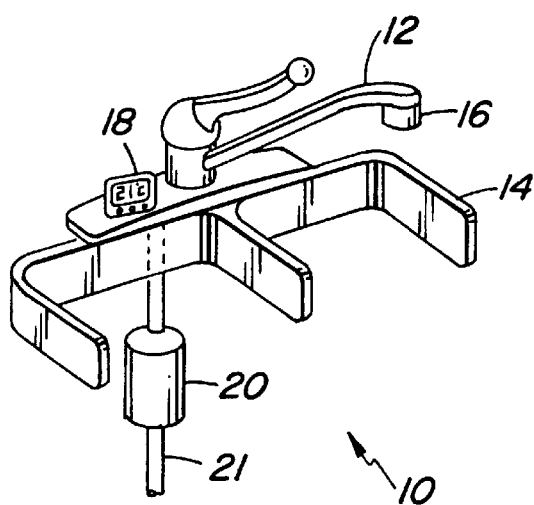
FIG. 1b is a perspective view of one embodiment of the invention showing a wireless link between the controller and shut-off valve.
Figure 1C:
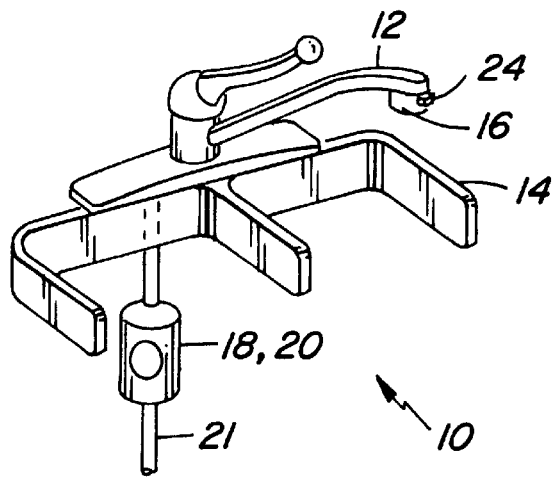
FIG. 1c is a perspective view of one embodiment of the invention showing a combined controller and shut-off valve.

Three different embodiments of a wireless temperature monitoring device 10 are illustrated in FIGS. 1a, 1b and 1c.

With reference to FIGS. 1a, 1b and 1c, a faucet 12 is shown mounted on a sink 14, the sink shown in cutaway. In each case, the temperature monitoring device 10 is shown comprising separate components, namely, a temperature sensor/transmitter 16, a controller 18 and shut-off valve 20 configured to the hot-water supply 21 of the faucet 12.

In the embodiment shown in FIG. 1a, the controller 18 and shut-off valve 20 are shown as being connected by a wire link 22. The controller 18 is shown as having a digital display. FIG. 1b shows an embodiment with a wireless link between the controller 18 and shut-off valve 20 with the controller 18 also having a digital display. FIG. 1c shows an embodiment with the controller 18 and shut-off valve combined in a single unit without a digital display. A reset button 24 on the temperature sensor/transmitter 16 is also shown.

Figure 2:
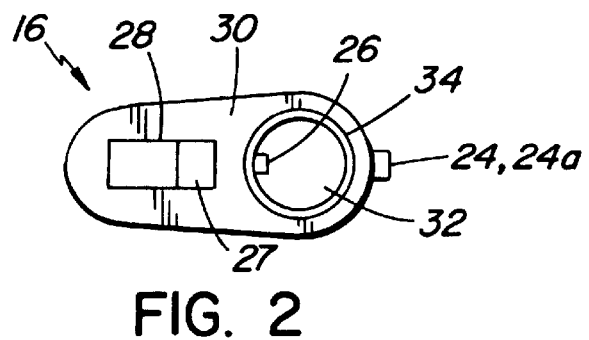
FIG. 2 is a top sectional view of a typical temperature sensor/transmitter of the invention.

With reference to FIG. 2, the temperature sensor/ transmitter 16 is a compact unit having a circuit which monitors the temperature of water flowing from the faucet 12 and which transmits the temperature information to the controller 18. The sensor/transmitter circuit includes a sensor 26, battery 27 and transmitter 28 within a sensor/ transmitter body 30. The sensor/transmitter body 30 is preferably a compact body having a bore 32 to permit the passage of water therethrough. The body 30 is also preferably fitted with standard faucet threads to permit attachment of the body 30 to the faucet 12 thereby allowing water to flow through bore 32 over sensor 26. The temperature sensor/transmitter 16 may also be provided with a reset button 24 to reactivate water flow if the associated shut-off valve 20 has been activated and/or an LED 24a which serves as a visual alarm.

Figure 3:
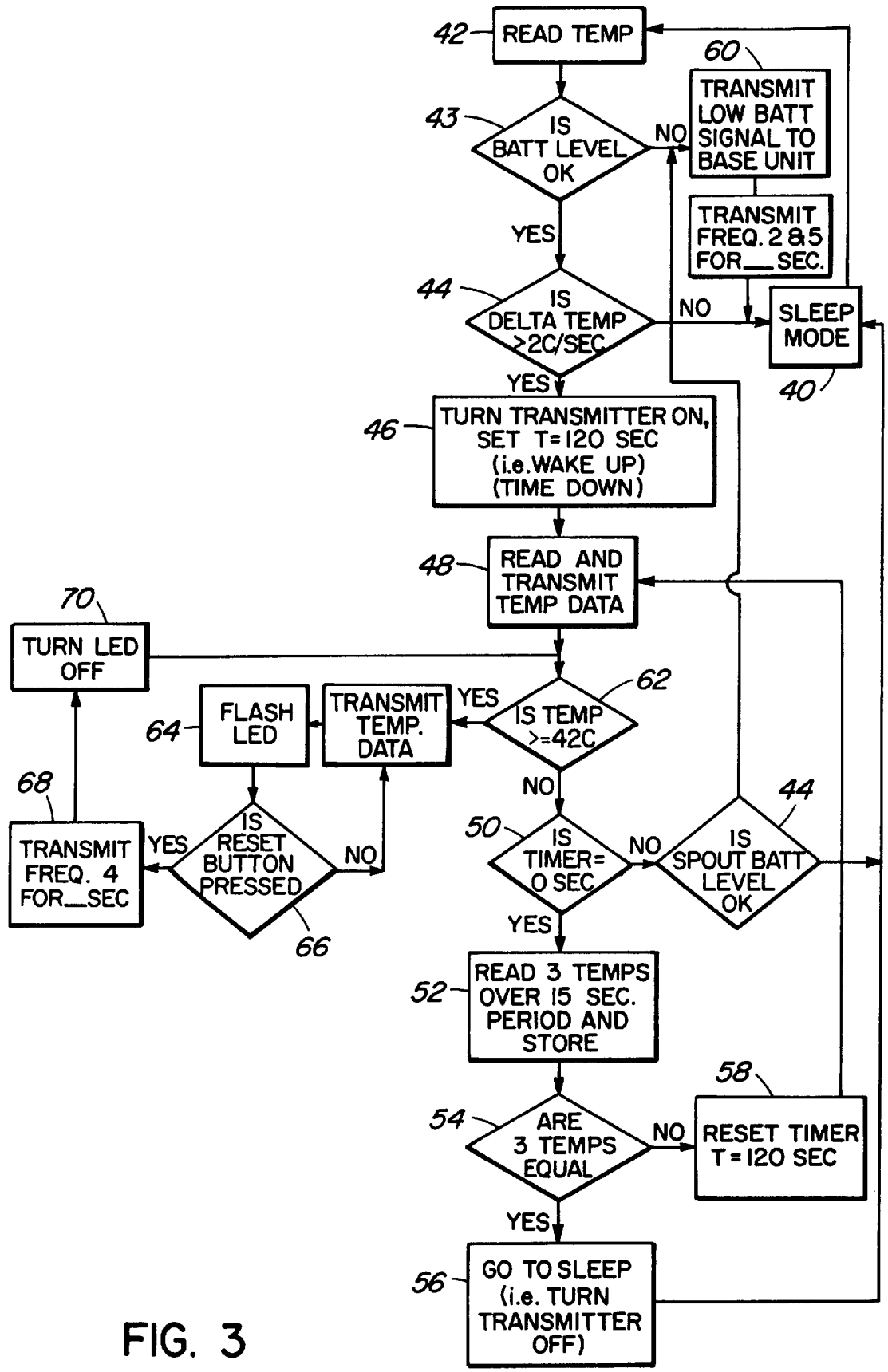
FIG. 3 is a flow chart of the typical operation of the temperature sensor/transmitter in accordance with the invention.

A flow chart of the operation of the temperature/sensor transmitter 16 is shown in FIG. 3. During non-use of the faucet 12, the faucet circuit is in a sleep mode (box 40) where a temperature transmission signal is not generated and transmitted in order to conserve battery power. While in the sleep mode 40, a temperature reading (box 42) is periodically taken from the sensor 26. The battery level is checked (box 43) and if OK, the rate of change of temperature (box 44) is determined on the basis of a temperature reading taken approximately 1 second previously. If the rate-of-change of temperature (box 44) is less than a pre-set value, for example, 2° C. per second, the circuit stays in sleep mode (box 40).

If the rate-of-change of temperature (box 44) is greater than 2° C. per second, the transmitter 28 is turned on. The transmitter 28 will remain active for a pre-set time value, for example, 120 seconds after which time, the transmitter will be shut-off (box 46). During transmitter ON, temperature data (box 48) is read and transmitted to the controller 18. At the expiry of the pre-set time value (box 50), the circuit will read 3 temperatures over a 15 second time period (box 52) and store these readings. The circuit will determine if the three temperature readings are equal (box 54) and, if so, the transmitter 28 is turned off and the unit is returned to the sleep mode (box 40). If the three temperature readings are not equal at box 54, the timer is re-set to the pre-set value and the transmitter 28 remains ON and continues to transmit temperature data (box 48). During both the transmitter ON and OFF modes, the circuit also continues to monitor the status of the battery 27. If the battery status is not OK, a low battery signal (box 60) is transmitted to the controller 18. The low battery signal is transmitted at a distinct frequency or pulse width.

In an embodiment of the invention having a reset button on the body 30, the circuit may determine if the water temperature is greater than a set value (box 62), for example 42° C. If the water temperature exceeds this value, temperature data is continued to be transmitted and an LED 24a may be activated to flash (box 64). Pressing the reset button (box 66) will cause a reset signal (box 68), at a distinct frequency or pulse width, to be transmitted to the controller 18 and to turn off the LED (box 70), if any.

Figure 4A:
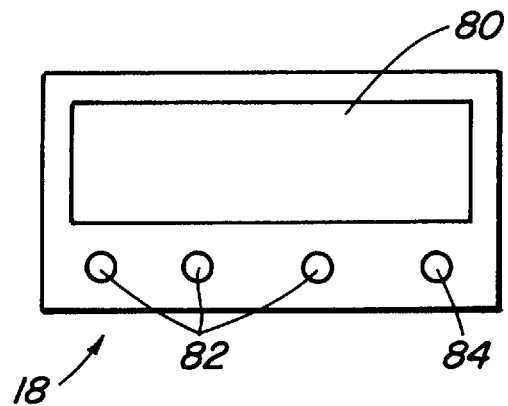
FIG. 4a is a schematic diagram of the exterior features of a typical controller of the invention.
Figure 4B:
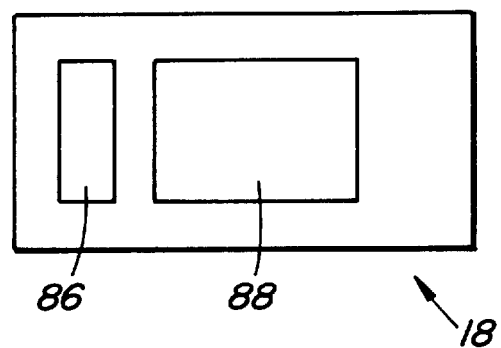
FIG. 4b is a schematic diagram of the interior features of a typical controller of the invention.

With reference to FIGS. 4a and 4b, the controller 18 includes a circuit which receives and interprets the signals from the temperature sensor/transmitter 16. In a preferred embodiment, the controller 18 includes an LCD screen 80, push-buttons 82 and LED indicator 84. Internally, the controller 18 includes a power supply 86 and controller circuit 88 as shown in FIG. 4b. A flowchart of the operation of the controller circuit is shown in FIG. 5.

The controller circuit 88 includes a sleep mode, a safety OFF mode and a safety ON mode. The controller circuit 88 contemplates the use of 5 operating frequencies and five flagging variables. It is, however, understood that the controller operation described herein is merely representative of various control schemes which may be implemented.

Figure 5A:
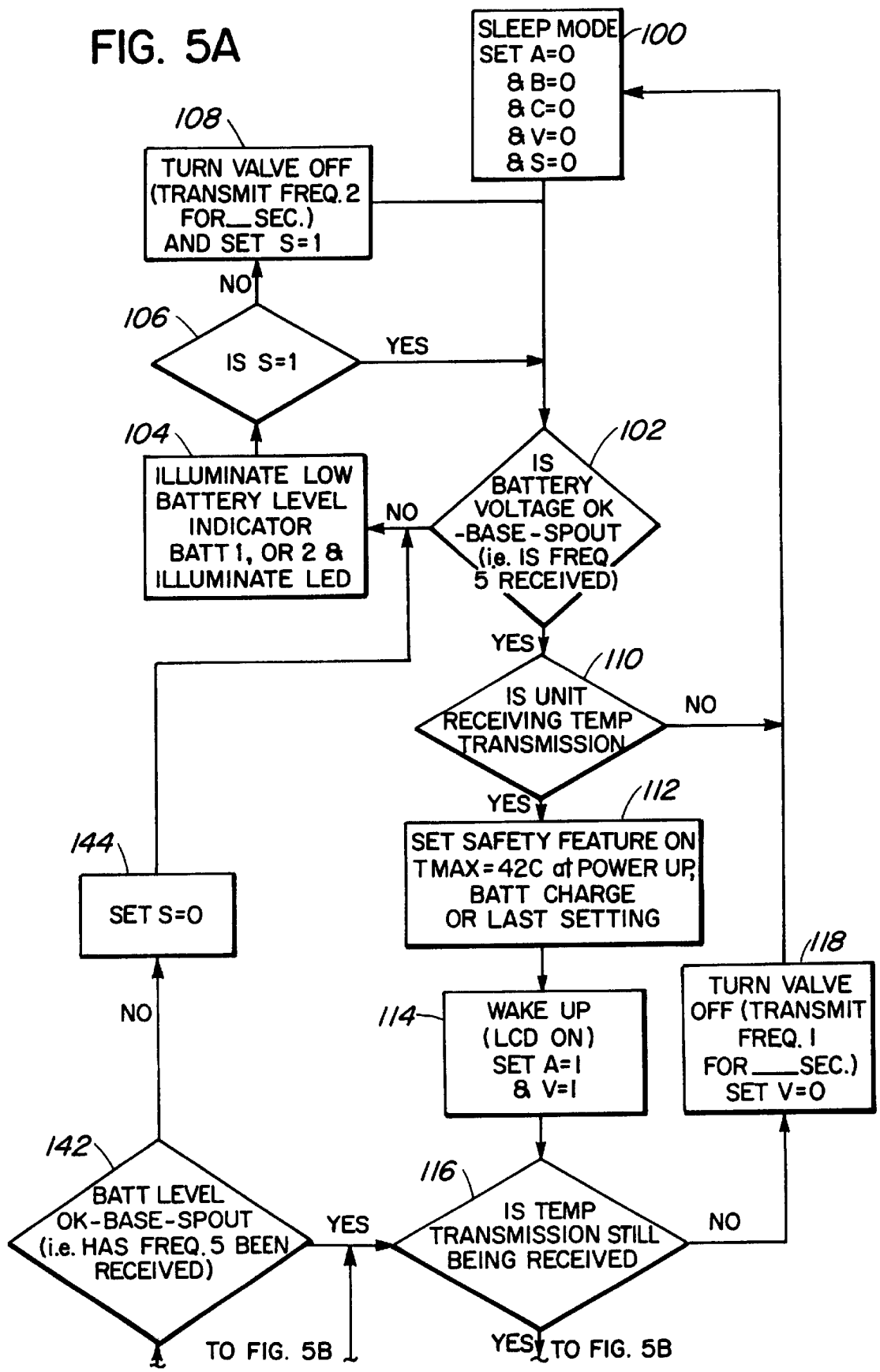
FIG. 5 is a flow chart of the typical operation of the controller in accordance with the invention.
Figure 5B:
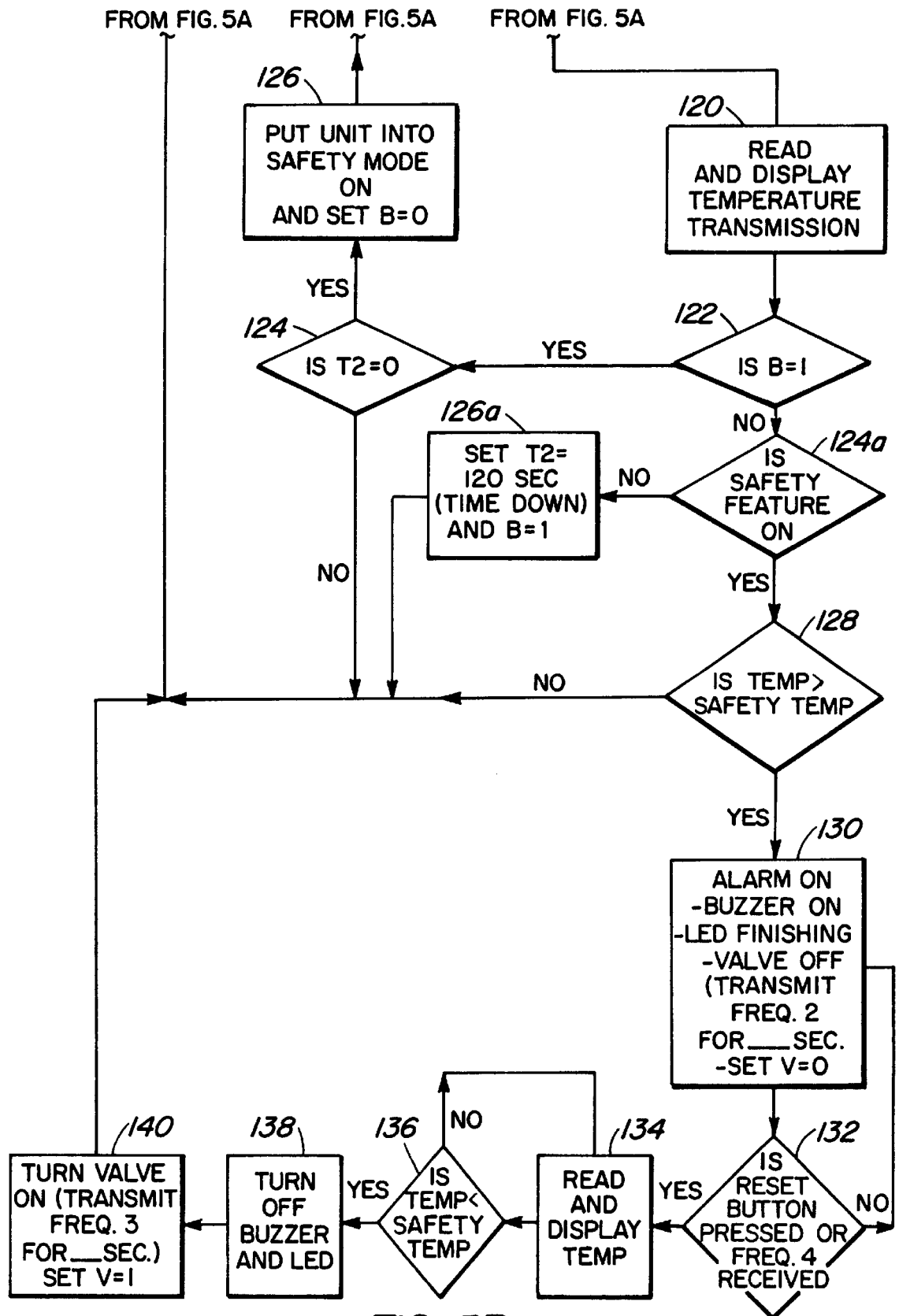

With reference to FIG. 5, during the sleep mode (box 100), variables designated "a", "b", "c", "v" and "s" are set to zero. Battery status of both the controller and faucet circuits are checked, the controller battery 86 through a battery check circuit and the faucet circuit battery on receipt of a battery voltage signal (designated frequency 5) from the temperature sensor/transmitter 16. If battery voltage of either circuit is insufficient, a low battery indicator, such as LED 84, will be activated (box 104) indicating that replacement of one or more batteries is required. Alternatively, an LCD segment on the controller screen may be illuminated indicating the low battery status. If variable "s" remains false (box 106), ie zero, a turn valve off signal (box 108) is sent to the shut-off valve 20 at a distinct frequency (designated frequency 2). If "s" is true, that is one, the battery voltage check (box 102) is repeated.

If battery voltage (box 102) is ok, the circuit 88 determines if it is receiving a temperature transmission signal (box 110). If no, the circuit stays in sleep mode (box 100). If yes, indicating use of the faucet, the circuit 88 defaults to the safety ON mode and sets variables "a" and "v" true. Variable "a" activates the LCD screen 80. Variable "v" activates the shut-off valve 20 allowing water to flow (box 114). The circuit 88 will then determine if a temperature transmission is still being received (box 116). If no, then "v" is set false and the shut-off valve 20 is closed (box 118).

If the temperature transmission is being received (box 116), the circuit 88 continues to receive and display the temperature transmission (box 120) and checks if variable "b" is true (box 122). If "b" is true, and T2 is zero (box 124) (T2 is described below), the unit is maintained in safety ON mode and "b" is set false (box 126).

If "b" is false (box 122), the circuit 88 checks if the safety feature is ON (box 124a). If no, T2 is given a pre-set value, for example corresponding to a 120 sec ON time, and "b" is set true (box 126a), thereby taking the system to a bypass condition where the faucet water temperature is allowed to exceed its maximum shut-off temperature. Safety feature (box 124a) may be de-activated by a specific key sequence on the controller 18.

If Safety feature (box 124a) is ON, the circuit 88 determines if the water temperature exceeds the max shut-off temperature (box 128). If yes, the alarm is turned ON thereby activating LED 84 and/or a buzzer alarm and "v" is set false thereby causing the valve 20 to close (box 130). For a wireless model, this is accomplished through a distinct radio frequency (designated frequency 2).

If the reset button is pressed, or frequency 4 is received, (box 132) a temperature reading is taken and the temperature is displayed (box 134). If the reset button is not pressed, or frequency 4 is not received, the alarm remains ON (box 130).

At box 136, the temperature reading is compared to the maximum shut-off temperature. If the temperature is greater than the shut-off temperature, temperature readings are read and displayed (box 134). If the temperature is less than the shut-off temperature, the alarm is turned OFF (box 138).

After the alarm has been turned OFF, "v" is set true, the shut-off valve 20 is turned on through frequency 3 (wireless model) (box 140). With the valve 20 ON, the battery level is checked in the controller and faucet (box 142). If the battery levels are OK, the system checks for temperature readings (box 116). If the battery levels in the controller 18 or temperature sensor/transmitters are not OK (box 142), "s" is set false and a low battery indicator (box 104) is activated.

Figure 6:
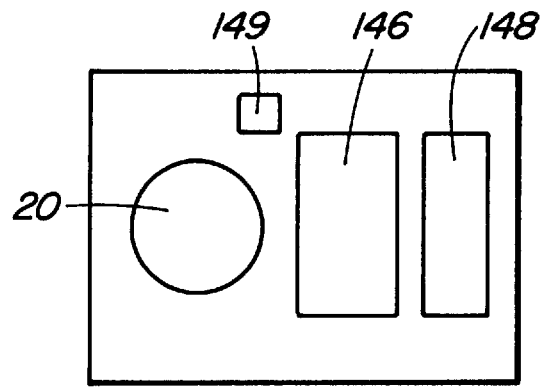
FIG. 6 is a schematic diagram of the interior features of a typical valve driver of the invention.

The shut-off valve 20 is a valve configured to the hot-water supply 21 of a faucet 12 and is responsive to the controller 18. The shut-off valve 20 includes a shut-off valve circuit 146, battery 148 and pressure sensor 149, shown schematically in FIG. 6.

Figure 7:
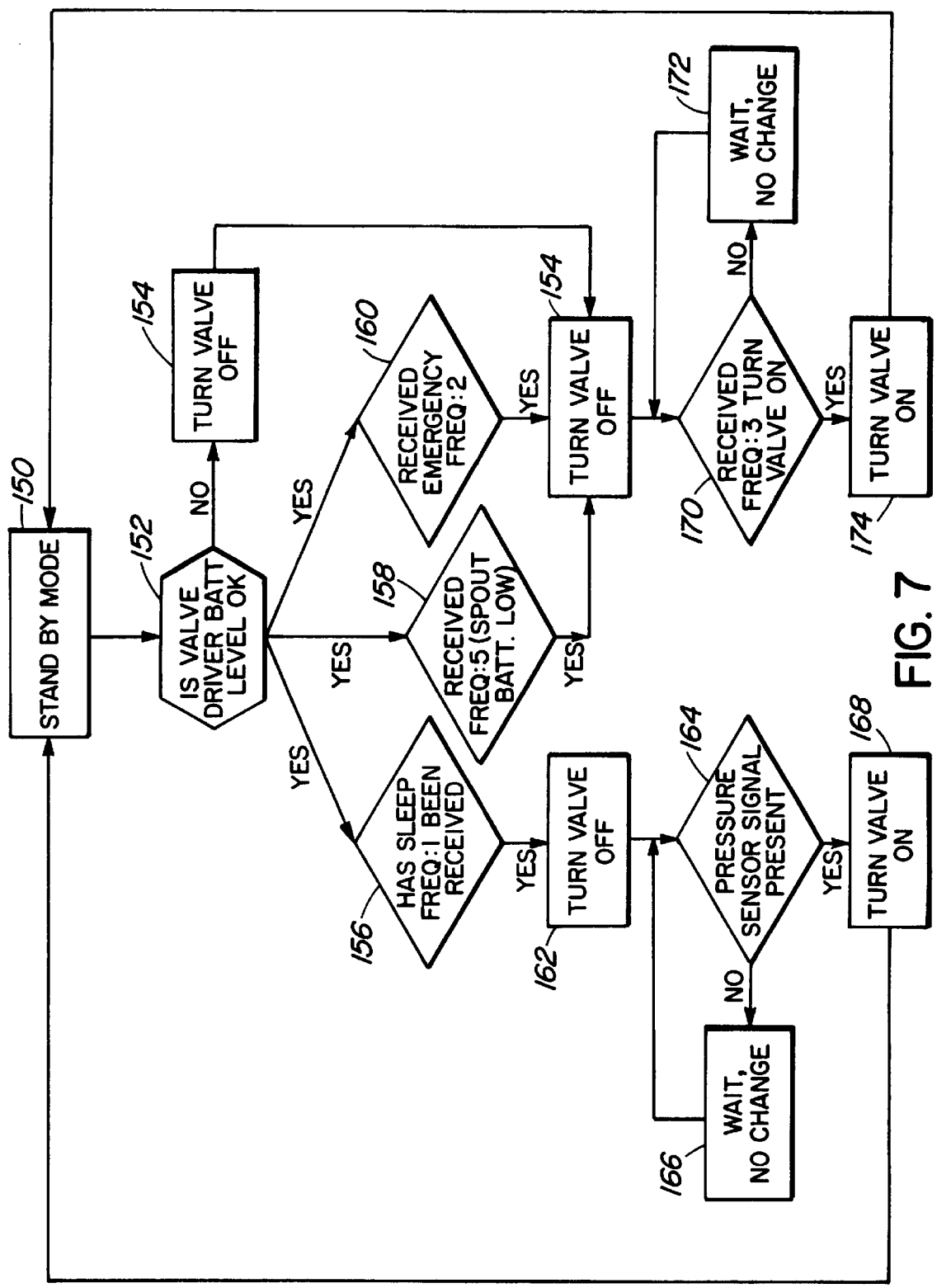
FIG. 7 is a flow chart of the typical operation of the valve driver in accordance with the invention.

A valve driver flow chart is shown in FIG. 7. With the faucet on, the valve driver is in a stand-by mode with the valve open (box 150). During stand-by, the valve driver circuit checks the status of the battery 148 (box 152). If the battery status is low, the valve 20 is turned off (box 154). If the battery status is OK, the valve circuit awaits receipt of shut-off signals from the controller 18. These can be received as three distinct frequencies, designated frequency 1 to place the valve in a sleep mode (box 156), frequency 5 indicating a low battery condition (box 158) from the controller 18 or frequency 2 indicating the maximum pre-set temperature has been exceeded (box 160).

In the case of receiving a frequency 1 sleep signal (box 156), the shut-off circuit 146 will turn the valve off (box 162) and will remain off until an activation signal is received through a pressure sensor signal (box 164). A pressure sensor 149 is mounted downstream of the valve 20 to signal use of the faucet. Accordingly, if the faucet is off, the pressure sensor 149 will detect a line pressure between the shut-off valve and faucet valve. If the faucet is turned on, the line pressure will drop, thereby producing a signal to turn the shut-off valve ON (box 168). The valve will remain ON in stand-by mode (box 150). If no pressure signal is received, the system will wait with the valve Off (box 166). Box 164 represents the start-up location of the program during power-up or battery change.

In the case of receiving a frequency 5 signal or a frequency 2 signal indicating low battery status in the controller or spout battery or a water temperature in excess of the maximum temperature, the valve 20 is turned off (box 154). If a frequency 3 signal is received (box 170), the valve 20 is turned on (box 174), otherwise the circuit waits for the appropriate valve ON signal (box 172).

Figure 8:
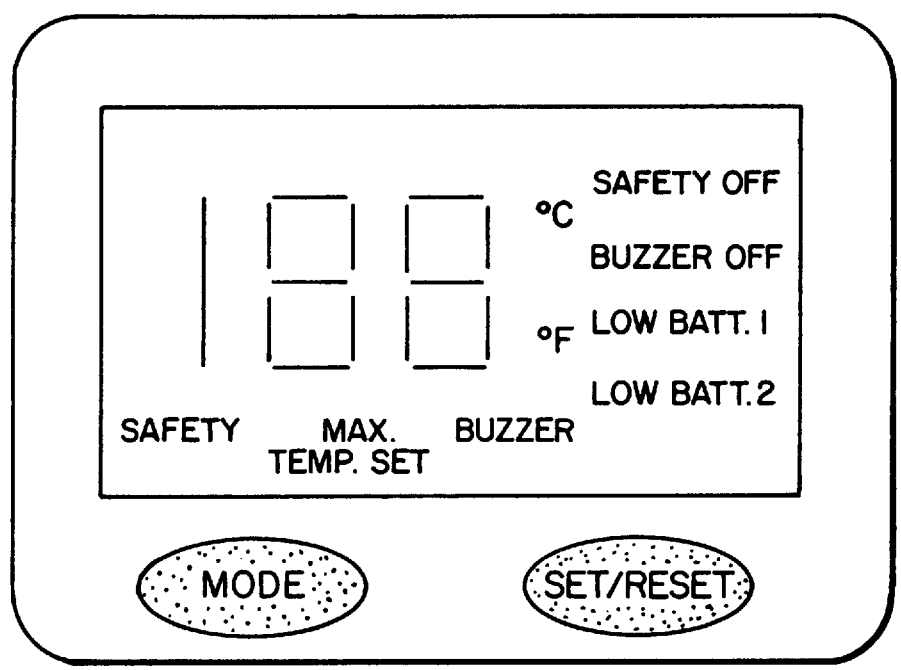
FIG. 8 is a schematic diagram of the exterior features of a typical controller of the invention.

It is understood that various forms of display and or programming control of the system may be implemented without departing from the spirit and scope of the invention. A typical schematic diagram of a controller 18 is shown in FIG. 8. Programming sequences may enable the user to set the maximum shut-off temperature, toggle between Fahrenheit and Celsius displays, toggle between Safety-ON and Safety-OFF modes and provide the appropriate audio and visual alarms if a dangerous water temperature is present. The display may also show battery status of the controller 18 and temperature sensor/transmitter 16.

The operation of a further and preferred embodiment of the invention is shown in FIGS. 9–12 which describe control schemes of the temperature sensor/transmitter 16, a display unit 18 and shut-off valve 20.

Figure 9:
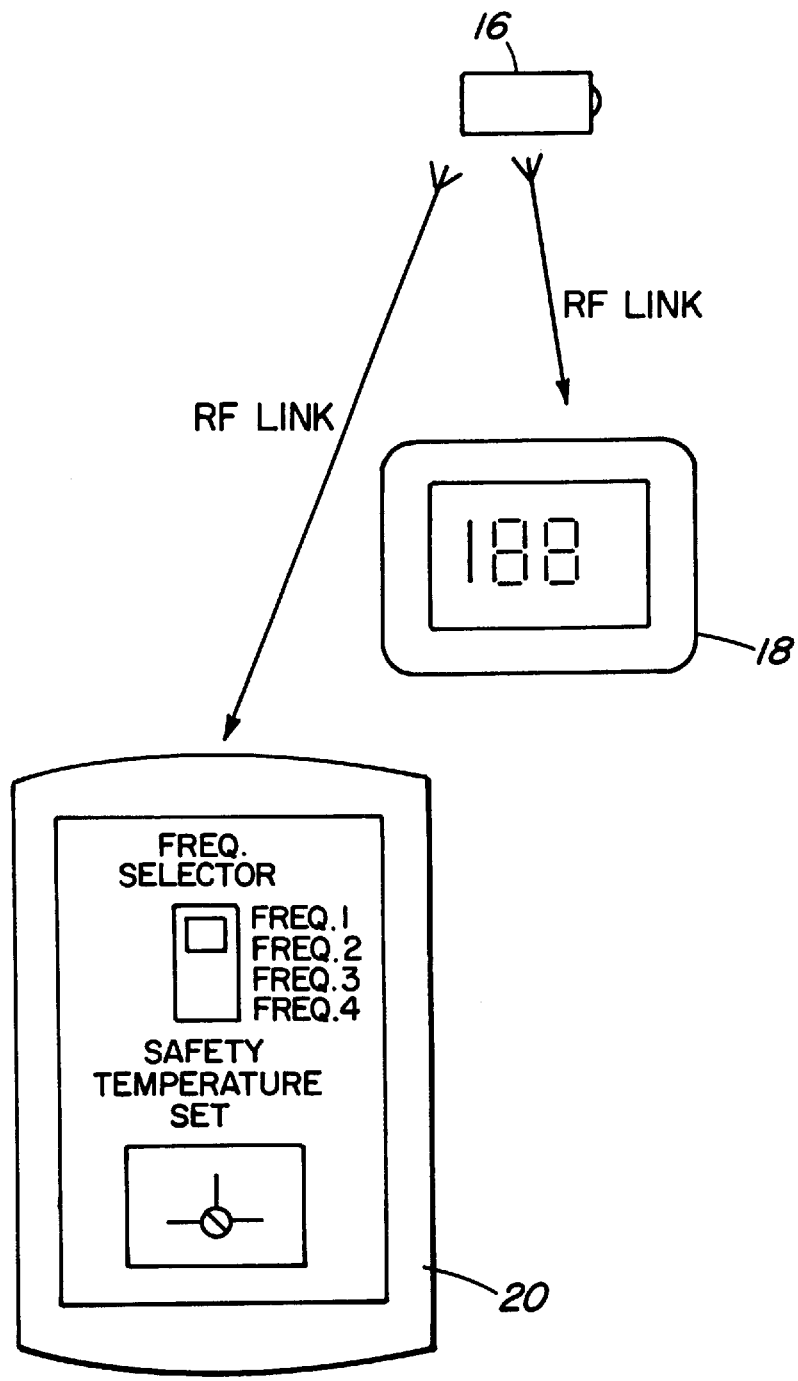
FIG. 9 is a schematic diagram of the components of the invention showing the communication links.

With reference to FIG. 9, the temperature sensor/transmitter 16 is shown to communicate via an RF link directly with both the base unit 18 and shut-off valve 20. In this embodiment, the temperature sensor/transmitter 16 continuously transmits temperature data to both the base unit 18 and shut-off valve 20.

Figure 10:
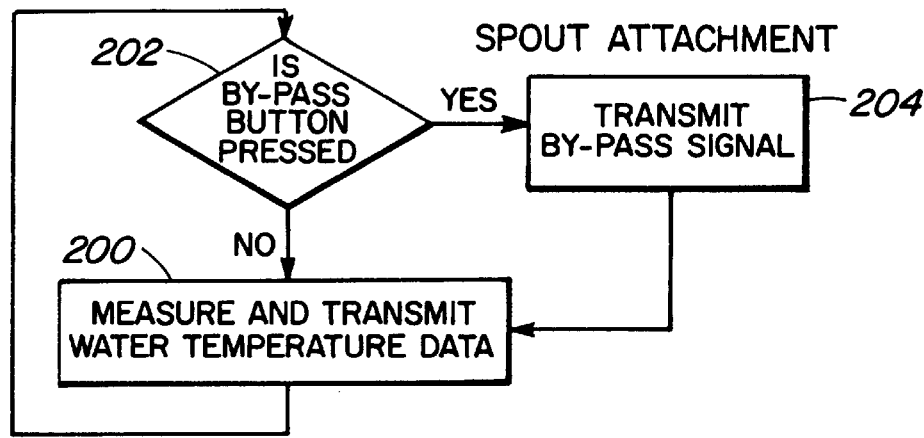
FIG. 10 is a flow chart showing a preferred control scheme for the operation of the temperature sensor/ transmitter in accordance with the invention.
Figure 11:
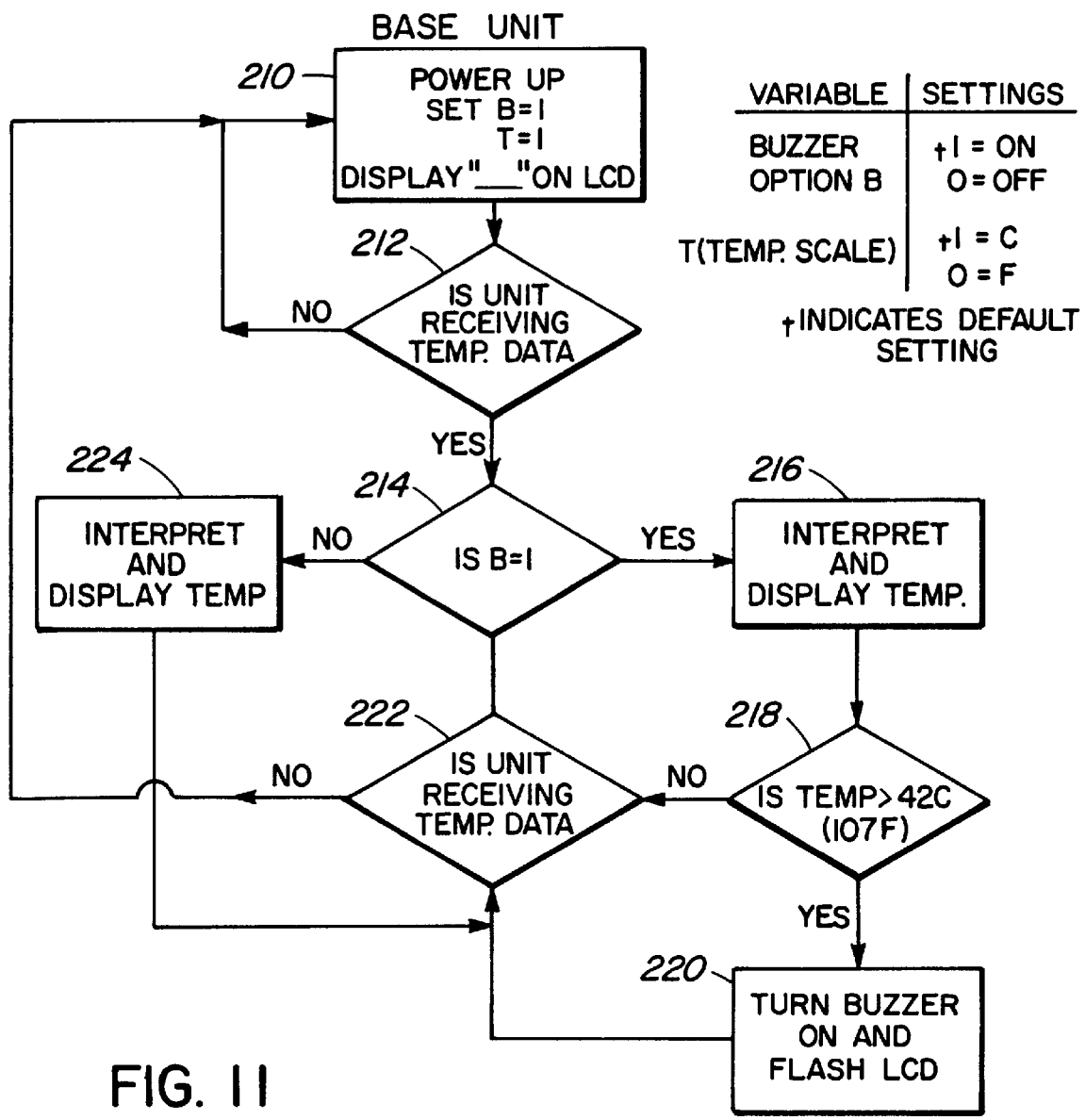
FIG. 11 is a flow chart showing a preferred control scheme for the operation of the base unit in accordance with the invention.
Figure 12:
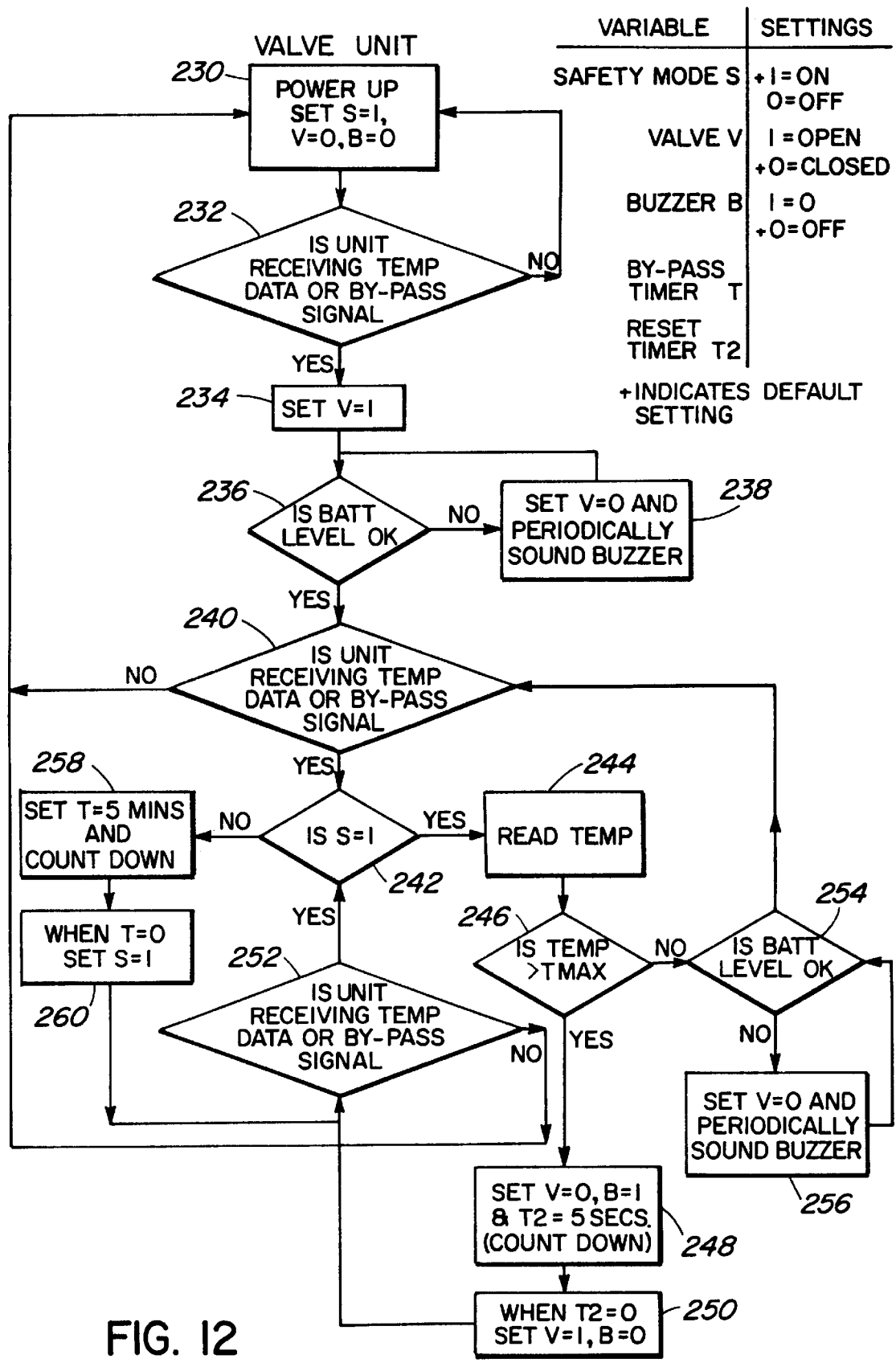
FIG. 12 is a flow chart showing a preferred control scheme for the operation of the valve unit in accordance with the invention.

FIGS. 10–12 show control schemes for the temperature sensor/transmitter 16, base unit 18 and shut-off valve 20 respectively. With reference to FIG. 10, the temperature sensor/transmitter 16 continuously transmits temperature data as shown in box 200. If the by-pass button 24 is depressed (box 202) a specific by-pass signal (box 204) is transmitted. The temperature sensor/transmitter 16 contemplates the use of a pulse-width modulated signal, wherein the signal pulse-width is proportional to a specific temperature. Depression of the by-pass button will cause a specific signal of a particular pulse-width to be transmitted which is interpreted as a by-pass signal by the valve unit 20.

With reference to FIG. 11, the base unit receives and processes the temperature data from the temperature sensor/transmitter and displays this information. At power up (box 210), variables "B" and "T" are manually set as B=1 and T=1 by a keyswitch located on the base unit. Variable "B" indicates the two modes of operation, namely safety-on or safety-off. If B=1 the base unit is in safety mode whereas if B=0, the base unit is in safety-off mode. Variable "T" indicates the temperature scale. T=1 will display temperature in degrees Celsius while T=0 will display temperature in degrees Fahrenheit. After power-up, at box 212, the base unit determines if it is receiving temperature data. If no, the circuit returns to the power up module (box 210). If the unit is receiving temperature data, the circuit determines the mode of operation. If B=1 (box 214), the temperature data is interpreted and displayed (box 216). If the temperature exceeds a pre-set safety value (box 218), a buzzer will turn on and the LCD display may flash (box 220) and continue to check the receipt of temperature data (box 222). If the temperature is less than a pre-set value (box 218), the unit will similarly continue to check the receipt of temperature data (box 222). If the unit has been set in safety-off mode (box 214) and B=0, temperature data is interpreted and displayed (box 224). However, in the safety-off-mode, no alarms are activated if a signal corresponding to high temperature water is received. As in the safety-on mode, the unit continues to check the receipt of temperature data (box 222). If, at box 222, temperature data is not received, the power-up circuit is activated (box 210).

With reference to FIG. 12, operation of the valve unit is described. Generally, the valve unit receives and interprets temperature and by-pass signal data from the temperature sensor/transmitter. The valve unit has three variables, namely safety mode, "S", valve, "V", and buzzer, "B" each of which can be either 1 or 0. S=0 corresponds to safety mode off whereas S=1 indicates safety mode on. V=0 sets the valve closed whereas V=1 sets the valve open and B=0 indicates the alarm is off while B=1 indicates the alarm is off. The circuit also includes timing variables T and $T_2$ representing specific timing values in seconds.

At power-up (box 230) the variables are set as S=1, V=0 and B=0. At box 232, the unit determines whether it is receiving temperature data or a by-pass signal. If no, the circuit returns to box 230 and continues to loop until data is received. If temperature data is received, V=1 and the valve is opened allowing water to flow through the faucet. At box 236, a battery check is made. If the battery level is ok, the unit continues to determine whether temperature data is being received (box 240) otherwise V is set as 0 and the buzzer will be periodically sounded (box 238). At box 240, if temperature data is being received (that is, not a by-pass signal), S=1 (box 242) and temperature data is interpreted (box 244). If the temperature is greater than the shut-off temperature (box 246), V is set to 0 (valve closed), B is set to 1 (alarm on) and T2 begins to count down (box 248). Typically, $T_2$ would be 5 seconds. Accordingly, when $T_2$ is 0, that is 5 seconds have elapsed, (box 250), V is set to 1 (valve opens) and B is set to 0 (alarm off). The unit continues to check if it is receiving data (box 252) and, if so, returns to box 242. At box 246, if the temperature is less than the shut-off temperature, the unit checks the battery status (box 254). If the battery status is ok, the circuit returns to box 240 otherwise, V is set to 0 (valve closed) and the alarm is sounded periodically (box 256).

At box 242, if a by-pass signal is received, S is set to 0 (safety mode off) and timing sequence T begins to count down (box 258). Typically, T would be 5 minutes. When 5 minutes have elapsed (box 260), S is set to 1 (safety mode on) and the circuit proceeds to box 252.

At box 240 and box 252, if the unit is not receiving temperature data or a by-pass signal, the circuit returns to power-up (box 230).

Accordingly, in that the base unit and valve unit receive data from the temperature sensor/transmitter independently of one another, the invention may be implemented in different manners. For example, the base unit may be omitted, wherein the temperature of the water is not displayed to the user. Furthermore, the valve unit may be omitted wherein only the temperature of the water is displayed to the user.

Preferably, the valve unit is also provided with a rotary switch which allows the user to set the value of the shut-off temperature at discreet levels.

Similarly, in order to facilitate installation in an environment where multiple units may be installed in close proximity to one another, the temperature sensor/transmitter and valve unit are preferably provided with a frequency selector in order to enable operation of adjacent units at distinct frequencies so as to minimize the risk of interference.

In certain installations, such as in residential care facilities, old age homes, day care facilities and schools, full time anti-scald protection may be desired. Accordingly, units may be built which do not allow for de-activation of the anti-scald device.

In other installations, such as residential homes, it may be desired to provide an operator with the ability to bypass the safety-on mode as indicated above.

While the above described embodiments contemplate a radio frequency link between the sensor/transmitter 16, controller 18 and valve unit 20, other wireless links such as an LED, infrared or sound links may be utilized.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as followed:

1. A faucet control system to monitor the temperature of a fluid flowing from a faucet comprising:

a temperature sensor and transmitter for attachment to the faucet, the temperature sensor and transmitter for obtaining temperature data relating to the temperature of a fluid flowing from the faucet and for wireless transmission of the temperature data;

controller for receiving and processing the temperature data wherein the controller includes means for interrupting fluid flow from the faucet if the temperature of the fluid flowing from the faucet exceeds a pre-set value.

2. A faucet control system as in claim 1 wherein the means for interrupting fluid flow from the faucet is a solenoid valve.

3. A faucet control system as in claim 2 wherein the means for interrupting fluid flow includes a valve driver circuit for control of the solenoid valve, the valve driver circuit responsive to a shutoff signal from the controller.

4. A faucet control system as in claim 3 wherein the valve driver circuit includes a pressure sensor for detection of a pressure change between the solenoid valve and faucet and wherein the valve driver circuit is responsive to the pressure change to open the solenoid valve.

5. A faucet control system as in claim 3 wherein the solenoid valve is battery operated.

6. A faucet control system as in claim 4 wherein the valve driver circuit includes means for detecting and indicating battery status.

7. A faucet control system as in claim 1 wherein the controller is battery operated and includes means for detecting and indicating battery status.

8. A faucet control system as in claim 1 wherein the controller further comprises temperature display means for displaying the fluid temperature.

9. A faucet control system as in claim 8 wherein the temperature display means is an LCD display.

10. A faucet control system as in claim 1 wherein the temperature sensor and transmitter is battery operated.

11. A faucet control system as in claim 1 wherein the temperature sensor and transmitter include standard faucet threads for attachment of the temperature sensor and transmitter to the faucet.

12. A faucet control system as in claim 1 wherein the temperature sensor and transmitter communicates with the controller via a communication link selected from any one of a radio frequency, light-emitting diode or infrared communication link.

13. A faucet control system to monitor the temperature of a fluid flowing from a faucet comprising:

a temperature sensor and transmitter for attachment to a faucet, the temperature sensor and transmitter for obtaining temperature data of a fluid flowing from the faucet and for wireless transmission of the temperature data;

controller for receiving and processing the temperature data wherein the controller includes means for displaying the temperature of the fluid flowing from the faucet.

14. A faucet control system to monitor the temperature of a fluid flowing from a faucet comprising:

a temperature sensor and transmitter for attachment to the faucet, the temperature sensor and transmitter for obtaining temperature data relating to the temperature of a fluid flowing from the faucet and for continuous wireless transmission of the temperature data;

valve unit for receiving and processing the temperature data wherein the valve unit includes means for interrupting fluid flow from the faucet if the temperature of the fluid flowing from the faucet exceeds a pre-set value.

15. A faucet control system as in claim 14 wherein the temperature sensor and transmitter includes means for transmitting a by-pass signal.

16. A faucet control system as in claim 15 wherein the temperature data and by-pass signal are pulse-width modulated.

17. A faucet control system as in claim 14 wherein the valve unit includes means for toggling between a safety on and safety off mode wherein the valve unit toggles to the safety off mode upon receipt of a by-pass signal.

18. A faucet control system as in claim 17 wherein the safety off mode includes a countdown timing circuit and a first time delay for providing a time-delay for re-activation of the safety on mode whereby, upon expiry of the first time delay, the valve units toggles to the safety on mode.

19. A faucet control system as in claim 18 wherein the safety on mode includes a second countdown timing circuit and a second time delay for delaying opening the means for interrupting fluid flow in the event the temperature of the fluid flowing from the faucet exceeds a pre-set value.

20. A faucet control system as in claim 14 wherein the valve unit includes a battery, means for checking battery status and an alarm means for notifying a user in the event of low battery status.

21. A faucet control system as in claim 14 further comprising a base unit for receiving, displaying and interpreting temperature data from the temperature sensor and transmitter.

22. A faucet control system as in claim 21 wherein the base unit includes alarm means for notifying a user if the temperature of the fluid flowing from the faucet exceeds a pre-set maximum temperature.

23. A faucet control system to monitor the temperature of a fluid flowing from a faucet and to control the flow of fluid from the faucet, the faucet control system comprising:

a temperature sensor and transmitter adapted for attachment to the outflow end of a faucet, the temperature sensor and transmitter for obtaining temperature data relating to the temperature of a fluid flowing from the outflow end of the faucet and for wireless transmission of the temperature data;

controller adapted for attachment to inflow piping of a faucet, the controller further adapted for receiving and processing the temperature data wherein the controller includes means for interrupting fluid flow to the faucet if the temperature of the fluid flowing from the faucet exceeds a pre-set value.

* * * * *